United States Patent
Morishige et al.

(10) Patent No.: US 6,600,911 B1
(45) Date of Patent: Jul. 29, 2003

(54) EVEN HARMONIC DIRECT-CONVERSION RECEIVER, AND A TRANSMITTING AND RECEIVING APPARATUS USING THE SAME

(75) Inventors: Hideki Morishige, Tokyo (JP); Hiroshi Ikematsu, Tokyo (JP); Kenji Itoh, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/555,372
(22) PCT Filed: Sep. 30, 1998
(86) PCT No.: PCT/JP98/04389
§ 371 (c)(1), (2), (4) Date: May 30, 2000
(87) PCT Pub. No.: WO00/19621
PCT Pub. Date: Apr. 6, 2000
(51) Int. Cl.[7] .................................................. H04B 1/26
(52) U.S. Cl. .................. 455/307; 455/324; 455/318; 455/304
(58) Field of Search .................. 455/131, 311, 455/323, 324, 333, 339, 304, 307, 318

(56) References Cited

U.S. PATENT DOCUMENTS

| | | | | |
|---|---|---|---|---|
| 5,095,536 A | * | 3/1992 | Loper | 329/327 |
| 5,303,417 A | * | 4/1994 | Laws | 327/113 |
| 5,937,013 A | * | 8/1999 | Lam et al. | 375/340 |
| 6,029,052 A | * | 2/2000 | Isberg et al. | 455/131 |

FOREIGN PATENT DOCUMENTS

| | | |
|---|---|---|
| JP | 08-307174 | 11/1996 |
| JP | 09-172393 | 6/1997 |

\* cited by examiner

*Primary Examiner*—Thanh Cong Le
*Assistant Examiner*—T. Richard Lei
(74) *Attorney, Agent, or Firm*—Oblon, Spivak, McClelland, Maier & Neustadt, P.C.

(57) ABSTRACT

If a local oscillation wave of a frequency approximately half the received signal frequency is input to a low noise amplifier 2, a dc offset voltage caused by the nonlinearity of the amplifier is produced, thus degrading reception sensitivity. This problem is resolved by disposing before the low noise amplifier 2 a filter means, such as a bandpass filter 12, band-elimination filter 13, or high pass filter 14, with characteristics for passing the received wave and suppressing a frequency band at approximately half the received wave frequency, thus preventing a radiation wave at substantially the same frequency as the local oscillation wave from being input to the low noise amplifier 2. A filter circuit 15 is also provided in the low noise amplifier 2 as a means for eliminating a radiation wave input to the low noise amplifier 2.

12 Claims, 14 Drawing Sheets

EVEN HARMONIC DIRECT-CONVERSION RECEIVER, AND A TRANSMITTING AND RECEIVING APPARATUS USING THE SAME

FIELD OF TECHNOLOGY

The present invention relates to a receiver in a radio frequency communications system, and relates more specifically to an even harmonic direct-conversion receiver using an even harmonic quadrature mixer.

DESCRIPTION OF RELATED ART

Direct conversion reception is one method used to achieve size and weight reductions in a receiver for a radio frequency communications system. Direct conversion reception refers to a reception method in which a received radio frequency signal is frequency converted directly to a baseband signal and then demodulated without an intermediate frequency conversion step. The even harmonic direct-conversion receiver using an even harmonic quadrature mixer has been used to improve deterioration in reception sensitivity. FIG. 12 is a block diagram of an exemplary even harmonic direct-conversion receiver according to the related art.

Shown in FIG. 12 are an antenna 1; a low noise amplifier 2 for amplifying a signal received by the antenna, that is, a radio frequency signal; a bandpass filter 3; and an even harmonic quadrature mixer 4 comprising two unit even harmonic mixers. A local oscillation signal output from local oscillator 5 and the received signal (of frequency $f_{rf}$) passed through bandpass filter 3 are input to the even harmonic quadrature mixer 4. It is to be noted that the frequency ($f_p$) of the local oscillation signal output from the local oscillator 5 is approximately one-half the frequency of the received signal, and the even harmonic quadrature mixer outputs a baseband signal (of frequency $|f_{rf}-2f_p|$) by mixing the received signal and the local oscillation signal. Also shown in FIG. 12 are a low pass filter 6; a baseband signal amplifying circuit 7 comprising a plurality of baseband signal amplifiers for amplifying the baseband signal; and a signal processing circuit 11. The signal processing circuit 11 comprises an A/D converter 8, digital filter 9, and a digital operating circuit 10.

Operation of this even harmonic direct-conversion receiver is described next.

Referring to FIG. 12, a signal received at antenna 1 is amplified by low noise amplifier 2, and noise components at frequencies outside the received frequency band are strongly suppressed by the bandpass filter 3. The received signal passed by the bandpass filter 3 is then mixed with the output signal from the local oscillator 5 by the even harmonic quadrature mixer 4 (see FIG. 14) comprising two unit even harmonic mixers. The even harmonic quadrature mixer 4 then outputs I channel and Q channel baseband signals. The frequency of the oscillation wave output by the local oscillator 5 is approximately half the frequency of the signal received by the antenna 1.

The I and Q channel baseband signals output from the even harmonic quadrature mixer 4 are filtered by the low pass filter 6 to remove extraneous signals other than baseband signals. The baseband signals filtered by the low pass filter 6 are amplified to a level appropriate for input to the A/D converter 8 by the baseband signal amplifying circuit 7, which comprises a plurality of baseband amplifiers. The amplified baseband signals are converted to digital signals by the A/D converter 8, passed through the digital filter 9, and demodulated data is then obtained by the digital operating circuit 10.

It is possible to suppress deterioration in reception sensitivity due to secondary intermodulation distortion, auto-detection of the local oscillation wave, and other mixing of even harmonics by using an even harmonic quadrature mixer in an even harmonic direct-conversion receiver as described above. In addition to enabling receiver downsizing by use of a direct-conversion design, it is therefore also possible to improve reception sensitivity by using an even harmonic quadrature mixer.

It should be noted that the local oscillator 5 outputs to the even harmonic quadrature mixer 4 a local oscillation wave at approximately half the received signal frequency. At the same time, a radiation wave of substantially the same frequency as the local oscillation wave is also emitted from the local oscillator 5. This is referred to below as the radiation wave. When this radiation wave is input from the antenna 1 or input terminal of the low noise amplifier 2, the radiation wave from the local oscillator 5 is input to the low noise amplifier 2 in addition to the received signal.

Due to the nonlinearity of the amplifier, the low noise amplifier 2 thus outputs the received signal, the radiation wave, and a harmonic component of each. The second harmonic of the radiation wave is substantially the same frequency as the received signal. It therefore cannot be removed by the bandpass filter 3 disposed downstream, and is thus input to the even harmonic quadrature mixer 4. As a result, a dc offset voltage caused by the radiation wave is contained in the baseband signals output from the even harmonic quadrature mixer 4.

While the dc offset voltage contained in the baseband signals output from the even harmonic quadrature mixer 4 are relatively small, the dc offset voltage input to the A/D converter 8 becomes extremely high due to the extremely high gain of the baseband signal amplifying circuit 7. This then becomes a factor in data recognition errors when the data is subsequently evaluated by the digital operating circuit 10, and the bit error rate deteriorates.

FIG. 13 shows another even harmonic direct-conversion receiver using an even harmonic quadrature mixer according to a second example of the related art. It should be noted that like parts are identified by like reference numeral in FIG. 12 and FIG. 13, and further description thereof is thus omitted below.

Shown in FIG. 13 are a first low noise amplifier 2a, and a second low noise amplifier 2b disposed between the first low noise amplifier 2a and bandpass filter 3. A signal received from the antenna 1 is amplified by the first low noise amplifier 2a and second low noise amplifier 2b. The amplified signal is then input to the even harmonic quadrature mixer 4, and then demodulated to the original data by the downstream signal processing circuit 11.

A receiver thus comprised to amplify a signal received from the antenna using a plurality of low noise amplifiers for input to the even harmonic quadrature mixer is used, for example, in mobile communications base station equipment, and is used to amplify extremely weak received waves to an input level appropriate to a downstream even harmonic quadrature mixer while also maintaining a sufficient NF.

It is also possible for a radiation wave to be input from antenna 1 or the input terminals of first low noise amplifier 2a or second low noise amplifier 2b with a configuration as shown in FIG. 13. When a radiation wave is input from second low noise amplifier 2b, a drop in reception sensitivity can be expected similarly to that in the first prior art example described above. If a radiation wave is input before the first low noise amplifier 2a, a second harmonic component of the local oscillation wave (radiation wave) will be contained in the components of the received signal amplified by the first low noise amplifier 2a. As a result, the dc offset voltage will increase as the signal is subsequently amplified by the second low noise amplifier 2b and baseband signal amplifying circuit 7. This then becomes a factor in data recognition errors when the data is subsequently evaluated by the downstream signal processing circuit 11, and the bit error rate deteriorates.

It should be noted that to achieve a desired NF through amplification of a weak received signal to a desired signal level by a plurality of low noise amplifiers, the gain of the first low noise amplifier 2a is typically not very high and the second low noise amplifier 2b is set to a high gain level. If a particularly strong radiation wave is input to the first low noise amplifier 2a in this case, the received signal will be masked at the output terminal of the amplifier by the second harmonic of the local oscillation wave (radiation wave), and a large drop in reception sensitivity occurs.

It will thus be known from the above description that a conventional even harmonic direct-conversion receiver does not comprise a means for preventing radiation wave input from the input terminal of a low noise amplifier. As a result, a radiation wave input from an input terminal of a low noise amplifier produces a dc offset voltage and becomes a factor contributing to a loss of reception sensitivity.

Furthermore, a conventional even harmonic direct-conversion receiver having a plurality of low noise amplifiers also does not comprise a means for removing a radiation wave input from an input terminal of a low noise amplifier. Therefore, if a radiation wave input to the first low noise amplifier is amplified together with the received signal, it is not possible at a next low noise amplifier to remove the second harmonic of this local oscillation wave (radiation wave) from the received signal. This becomes a factor contributing to a loss of reception sensitivity.

Therefore, with consideration for the above described problems, a first object of the present invention is to provide an even harmonic direct-conversion receiver comprising a means for preventing radiation wave input to a low noise amplifier.

Furthermore, a second object of the present invention is to provide an even harmonic direct-conversion receiver comprising a means for removing a radiation wave input to a low noise amplifier.

Yet further, a third object of the present invention is to provide a communications system comprising a mobile communications terminal having a direct-conversion receiver and a mobile communications base station.

SUMMARY OF THE INVENTION

An even harmonic direct-conversion receiver according to the present invention comprises: an antenna; an amplifier for amplifying a received wave received by said antenna; a local oscillator for generating a local oscillation wave at approximately half the received wave frequency; an even harmonic quadrature mixer for mixing a received signal output from said amplifier and a local oscillation wave output from said local oscillator, and generating a baseband signal; a signal processing circuit for demodulating a baseband signal output from said even harmonic quadrature mixer; and a filter means disposed before said amplifier for preventing input of a radiation wave emitted from said local oscillator to said amplifier by passing the received wave received by said antenna and suppressing a frequency band at approximately half the received wave frequency.

An even harmonic direct-conversion receiver according to the present invention preferably comprises a bandpass filter as the filter means.

Alternatively, an even harmonic direct-conversion receiver according to the present invention preferably comprises a band-elimination filter as the filter means.

Alternatively, an even harmonic direct-conversion receiver according to the present invention preferably comprises a high pass filter as the filter means.

Furthermore, an even harmonic direct-conversion receiver according to the present invention preferably comprises an amplifier having a filter circuit for eliminating from said received signal a local oscillation wave emitted from the local oscillator and input to the amplifier.

A further even harmonic direct-conversion receiver according to the present invention comprises: an antenna; a first amplifier for amplifying a received wave received by said antenna; a second amplifier for amplifying output of said first amplifier; a local oscillator for generating a local oscillation wave at approximately half the received wave frequency; an even harmonic quadrature mixer for mixing a received signal output from said second amplifier and a local oscillation wave output from said local oscillator, and generating a baseband signal; a signal processing circuit for demodulating a baseband signal output from said even harmonic quadrature mixer; and a filter means disposed before said first amplifier or said second amplifier for preventing input of a radiation wave emitted from said local oscillator to said first amplifier or said second amplifier by passing the received wave received by said antenna and suppressing a frequency band at approximately half the received wave frequency.

This even harmonic direct-conversion receiver according to the present invention preferably comprises a bandpass filter as the filter means.

Alternatively, this even harmonic direct-conversion receiver according to the present invention preferably comprises a band-elimination filter as the filter means.

Alternatively, this even harmonic direct-conversion receiver according to the present invention preferably comprises a high pass filter as the filter means.

Furthermore, in this even harmonic direct-conversion receiver according to the present invention the first or second amplifier preferably comprises an amplifier having a filter circuit for eliminating from said received signal a local oscillation wave emitted from the local oscillator and input to the amplifier.

A transmitting and receiving apparatus according to the present invention comprises: an antenna; an even harmonic direct-conversion receiver having an amplifier for amplifying a received wave received by said antenna, a local oscillator for generating a local oscillation wave at approximately half the received wave frequency, an even harmonic quadrature mixer for mixing a received signal output from said amplifier and a local oscillation wave output from said local oscillator and generating a baseband signal, a signal processing circuit for demodulating a baseband signal output from said even harmonic quadrature mixer, and a filter means disposed before said amplifier for preventing input of a radiation wave emitted from said local oscillator to said amplifier by passing the received wave received by said antenna and suppressing a frequency band at approximately half the received wave frequency; and a transmitter having a signal processing section for processing a signal output from said even harmonic direct-conversion receiver and outputting a baseband signal for transmission, a signal processing circuit for modulating the baseband signal for transmission output from said signal processing section, a local oscillator for generating a local oscillation wave at a frequency of approximately half the transmission signal frequency, and an even harmonic quadrature mixer for mixing a local oscillation wave output by said local oscillator and a baseband signal for transmission modulated by said signal processing circuit and outputting a transmission signal.

In a further transmitting and receiving apparatus according to the present invention the even harmonic direct-conversion receiver comprises: a first amplifier for amplifying a received wave received by said antenna; a second amplifier for amplifying output of said first amplifier; a local oscillator for generating a local oscillation wave at approximately half the received wave frequency; an even harmonic quadrature mixer for mixing a received signal output from said second amplifier and a local oscillation wave output from said local oscillator, and generating a baseband signal; a signal processing circuit for demodulating a baseband signal output from said even harmonic quadrature mixer; and a filter means disposed before said first amplifier or said second amplifier for preventing input of a radiation wave emitted from said local oscillator to said first amplifier or said second amplifier by passing the received wave received by said antenna and suppressing a local oscillation wave of a frequency approximately half the received wave frequency.

DESCRIPTION OF THE PREFERRED EMBODIMENTS

Embodiment 1

Figure 1:
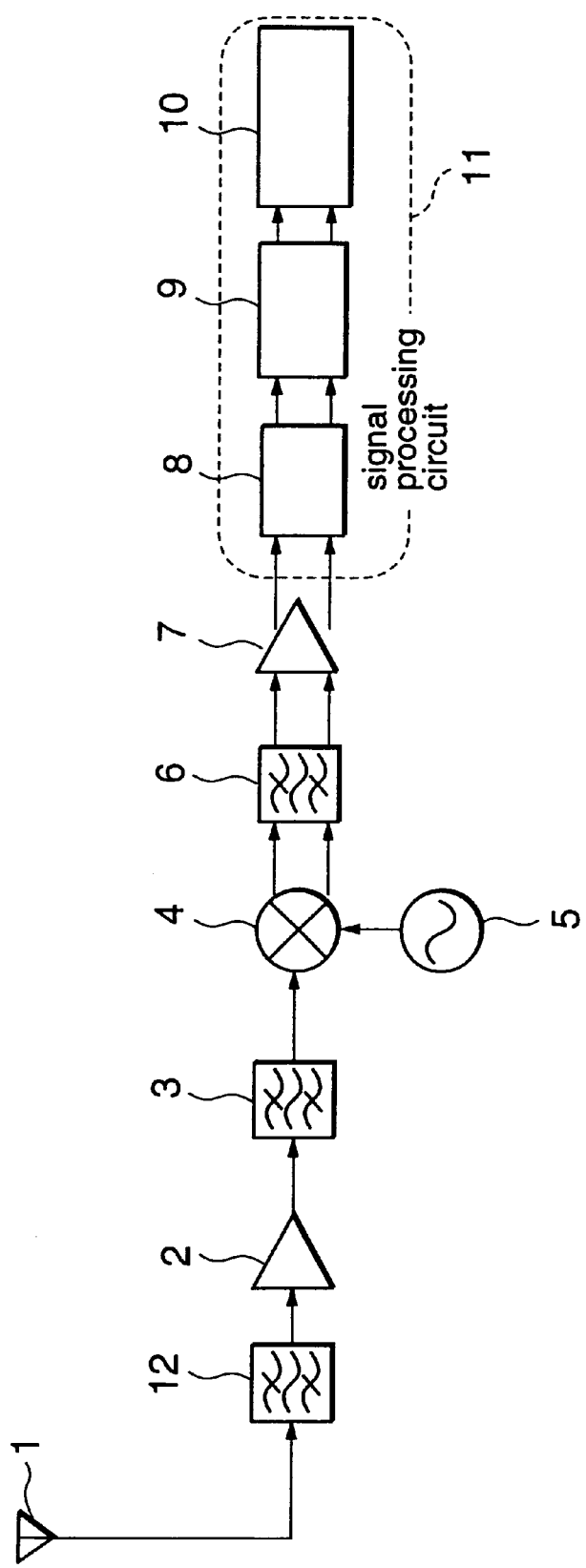
FIG. 1 is a block diagram of an even harmonic direct-conversion receiver according to a first preferred embodiment of the present invention.
Figure 2:
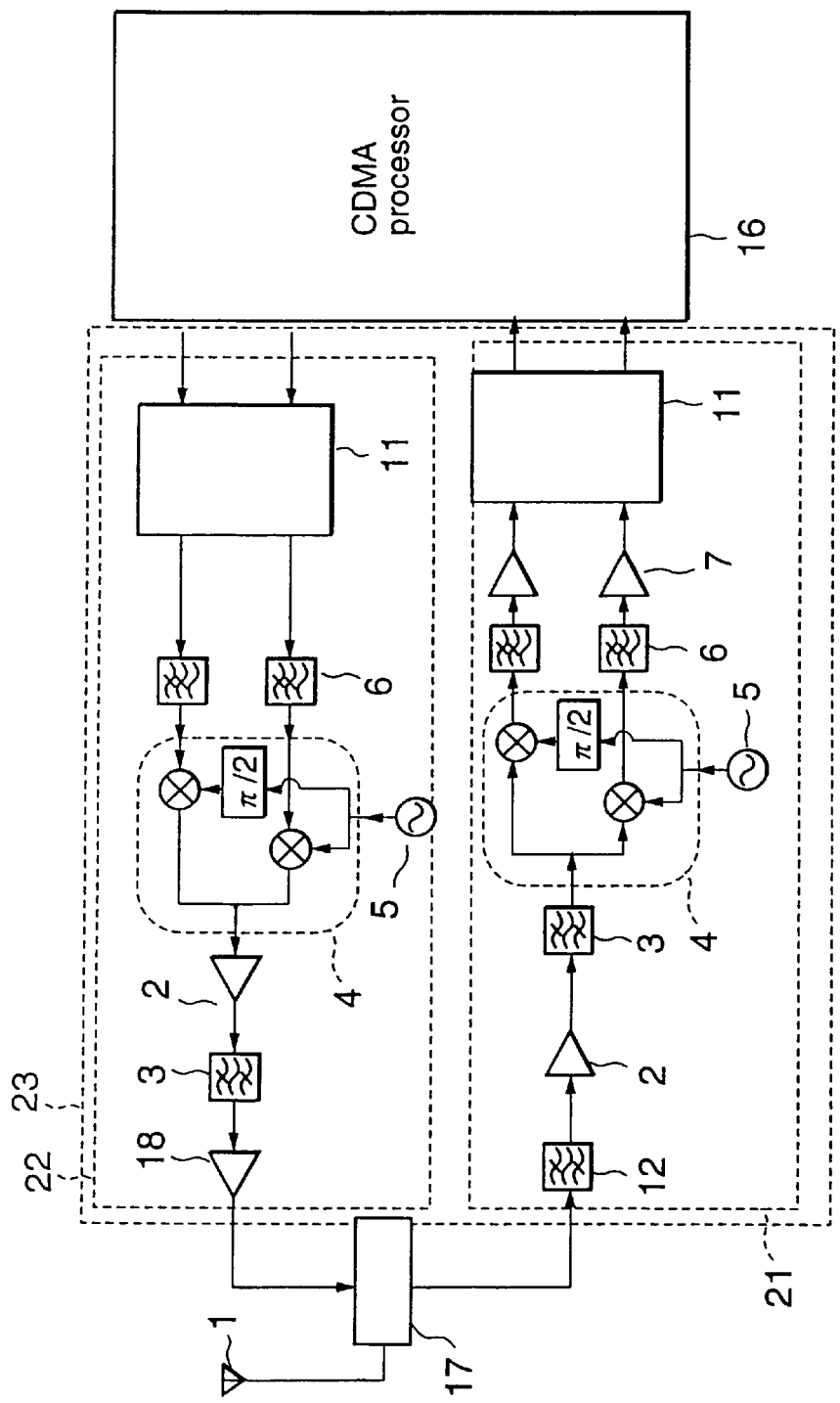
FIG. 2 is a block diagram of a transmitting and receiving apparatus used in a mobile communications terminal comprising an even harmonic direct-conversion receiver according to a first preferred embodiment of the present invention.

FIG. 1 is a block diagram of an even harmonic direct-conversion receiver according to the present invention. FIG. 2 is a block diagram of a transmitting and receiving apparatus used, for example, in a mobile communications terminal comprising an even harmonic direct-conversion receiver according to the present invention.

Figure 14:
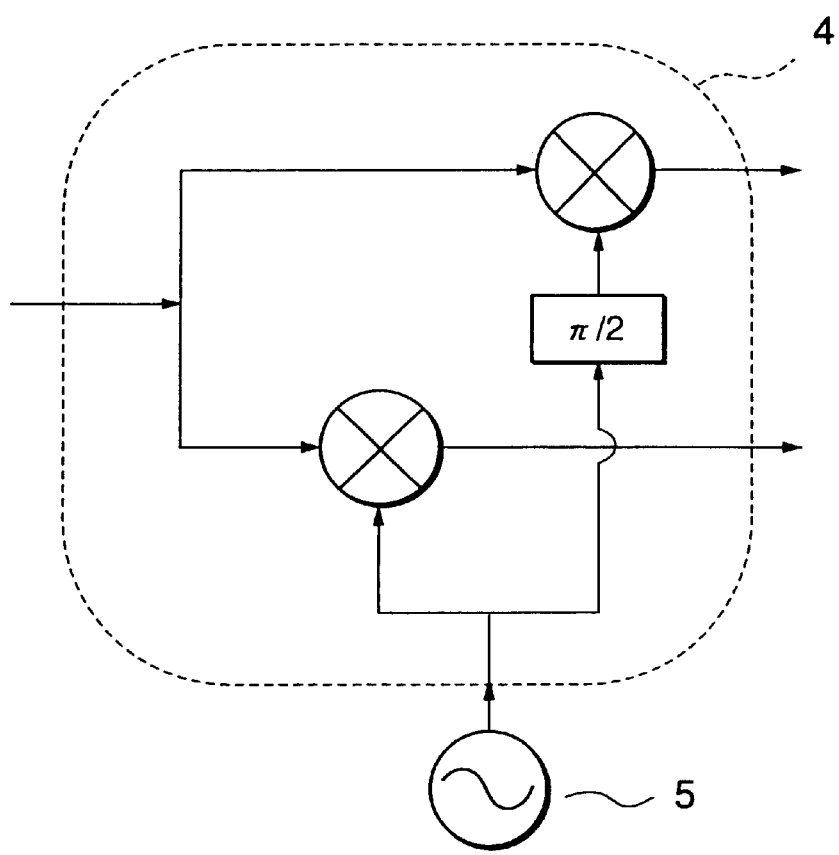
FIG. 14 shows an even harmonic quadrature mixer.

Shown in FIG. 1 are an antenna 1; low noise amplifier 2; bandpass filter 3 disposed after the low noise amplifier 2; a bandpass filter 12 disposed before the low noise amplifier 2; and an even harmonic quadrature mixer 4 comprising two unit even harmonic quadrature mixers for mixing a local oscillation wave generated by a local oscillator 5 with a received signal received by antenna 1, and outputting I channel and Q channel baseband signals. The even harmonic quadrature mixer 4 is shown in detail in FIG. 14. Also shown in FIG. 1 are a low pass filter 6, baseband signal amplifying circuit 7 comprising a plurality of baseband signal amplifiers; and a signal processing circuit 11 comprising an A/D converter 8, digital filter 9, and digital operating circuit 10. The baseband signals are demodulated to a digital signal and output to a CDMA processor (not shown in the figure) for CDMA processing.

Operation is described next. A signal received at antenna 1 passes the bandpass filter 12 and is input to the low noise amplifier 2. The received signal amplified by low noise amplifier 2 then passes bandpass filter 3 and is input to the even harmonic quadrature mixer 4. As described above in the first example of the related art, the even harmonic quadrature mixer 4 outputs I channel and Q channel baseband signals by mixing the received signal with a local oscillation wave. These baseband signals are then demodulated to the original data by the signal processing circuit 11.

The bandpass filter 12 disposed between the antenna 1 and low noise amplifier 2 strongly suppresses the frequency component (approximately half the received signal frequency) of the radiation wave emitted from the local oscillator 5. By thus disposing the bandpass filter 12 between the antenna 1 and low noise amplifier 2, a radiation wave input at a stage before the low noise amplifier 2 can be strongly suppressed by means of bandpass filter 12. In other words, a second harmonic component of the local oscillation wave (radiation wave) produced by the nonlinearity of the low noise amplifier 2 is not introduced to the received signal output from the low noise amplifier 2, and it is therefore possible to prevent a dc offset voltage being superposed to the baseband signal of each channel output from the even harmonic quadrature mixer 4.

The number of detection errors occurring when demodulating the baseband signals can thus be reduced by disposing a bandpass filter 12 between the antenna 1 and low noise amplifier 2 to prevent input to the low noise amplifier 2 of a radiation wave emitted from the local oscillator 5 at substantially the same frequency as the local oscillation wave.

It is therefore possible to prevent deterioration of the bit error rate, and reception performance capable of withstanding practical use can be assured.

An even harmonic direct-conversion receiver according to this first preferred embodiment of the present invention can be applied to the transmitting and receiving apparatus of a mobile communications terminal such as a mobile telephone. FIG. 2 is a block diagram of a transmitting and receiving apparatus of a mobile communications terminal, such as a mobile telephone, using an even harmonic direct-conversion receiver according to the present invention. The transmitting and receiving apparatus shown in FIG. 2 comprises a transmitting and receiving apparatus 23 having a transmitter 22 and a receiver 21, and a CDMA processor 16. Operation of this receiver 21 and transmitter 22 is described next below with reference to FIG. 2.

The receiver 21 is described first. A received signal received from antenna 1 passes from duplexer 17 through bandpass filter 12 and is input to the low noise amplifier 2. The received signal amplified by low noise amplifier 2 then passes bandpass filter 3 and is input to the even harmonic quadrature mixer 4. The even harmonic quadrature mixer 4 mixes the received signal with a local oscillation wave output from the local oscillator 5 (at approximately half the received signal frequency), and outputs I channel and Q channel baseband signals. These baseband signals output from the even harmonic quadrature mixer 4 pass the low pass filter 6 and baseband signal amplifying circuit 7, are then demodulated to the original data by the signal processing circuit 11, and the result is then CDMA processed by the CDMA processor 16.

The transmitter 22 is described next. Data output from the CDMA processor 16 is modulated by the signal processing circuit 11 and converted to I channel and Q channel baseband signals. These baseband signals are then filtered by low pass filter 6 to remove noise components, and input to the even harmonic quadrature mixer 4. The even harmonic quadrature mixer 4 mixes the baseband signals and a local oscillation wave generated by the local oscillator 5 at approximately half the frequency of the transmission signal, and outputs the transmission signal to the low noise amplifier 2. The transmission signal input to the low noise amplifier 2 is thus amplified and output to the bandpass filter 3. The bandpass filter 3 removes a noise component from the transmission signal output thereto, and then outputs the filtered transmission signal to a high-power amplifier 18. The high-power amplifier 18 amplifies the transmission signal from which noise has been removed by the bandpass filter 3 to the transmission level transmitted from the antenna 1. The transmission signal amplified to the transmission level by the high-power amplifier 18 is then passed from the duplexer 17 and transmitted from the antenna 1.

The even harmonic quadrature mixer 4 disposed in the receiver 21, and the even harmonic quadrature mixer 4 disposed in the transmitter 22, mix the local oscillation wave generated by the local oscillator 5 at approximately half the frequency of the received signal (or transmission signal) with the received signal (or transmission signal). The configuration of the even harmonic quadrature mixer 4 is shown in detail in FIG. 14. By thus applying an even harmonic direct-conversion receiver according to this first preferred embodiment of the present invention in a transmitting and receiving apparatus for a mobile communications terminal such as a mobile telephone, it is possible to suppress input of a local oscillation wave emitted from the local oscillator 5 on the transmission side to the low noise amplifier 2 on the reception side.

Embodiment 2

Figure 3:
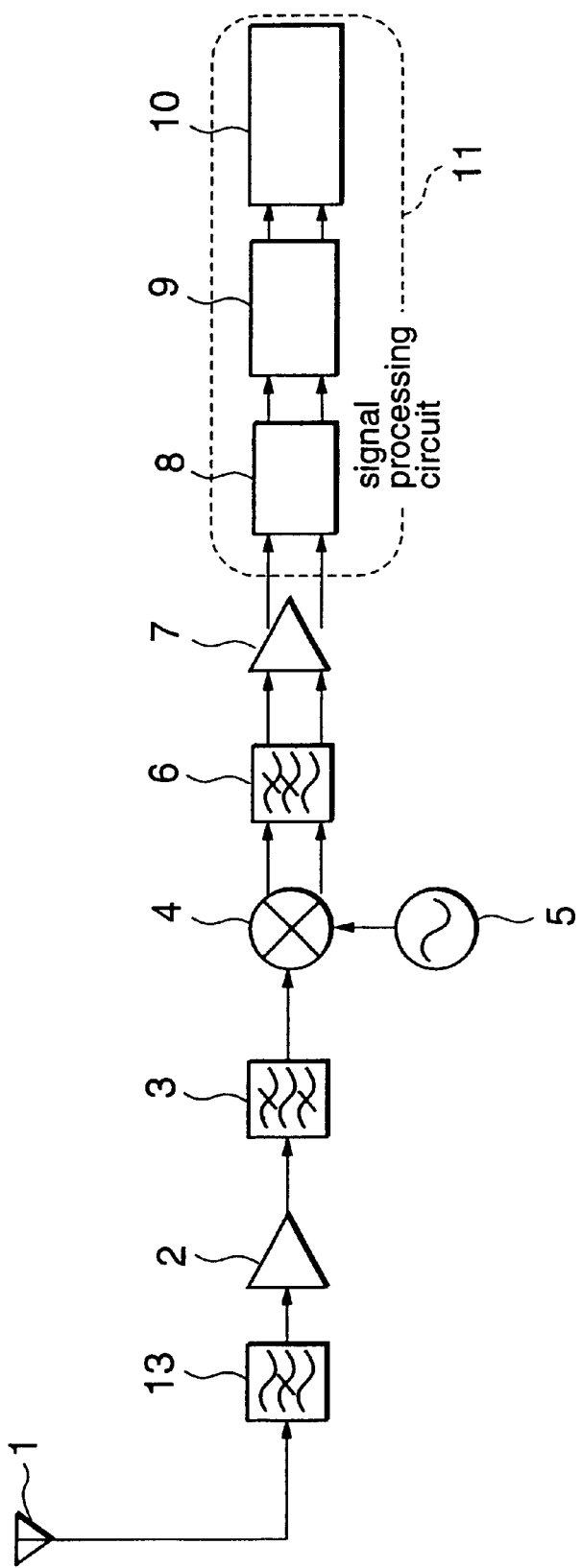
FIG. 3 is a block diagram of an even harmonic direct-conversion receiver according to a second preferred embodiment of the present invention.

FIG. 3 is a block diagram of an even harmonic direct-conversion receiver according to a second preferred embodiment of the present invention. It is to be noted that like parts in FIG. 3 and FIG. 1 are identified by like reference numeral, and further description thereof is thus omitted below.

An even harmonic direct-conversion receiver according to this second preferred embodiment of the invention comprises a band-elimination filter 13 inserted before the low noise amplifier 2. The suppression frequency of this band-elimination filter 13 is the frequency of radiation wave emissions from the local oscillator 5. The band-elimination filter 13 therefore blocks any radiation wave emissions from the local oscillator 5 that enter from antenna 1, thus enabling an improvement in reception sensitivity degradation.

Embodiment 3

Figure 4:
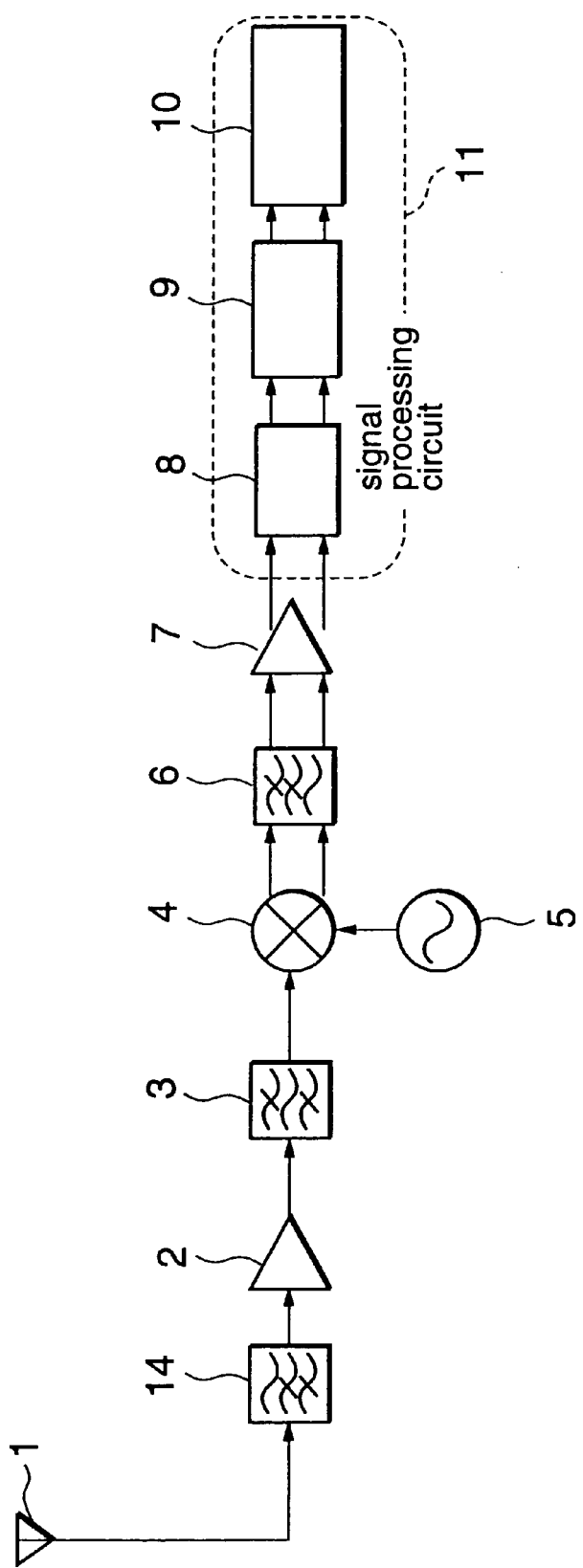
FIG. 4 is a block diagram of an even harmonic direct-conversion receiver according to a third preferred embodiment of the present invention.

FIG. 4 is a block diagram of an even harmonic direct-conversion receiver according to a third preferred embodiment of the present invention. It is to be noted that like parts in FIG. 4 and FIG. 1 are identified by like reference numeral, and further description thereof is thus omitted below.

An even harmonic direct-conversion receiver according to this third preferred embodiment of the invention comprises a high pass filter 14 inserted before the low noise amplifier 2. The suppression frequency of this high pass filter 14 is the frequency of radiation wave emissions from the local oscillator 5. The high pass filter 14 therefore blocks any radiation wave emissions from the local oscillator 5 that enter from antenna 1, thus enabling suppression of reception sensitivity degradation.

Embodiment 4

Figure 5:
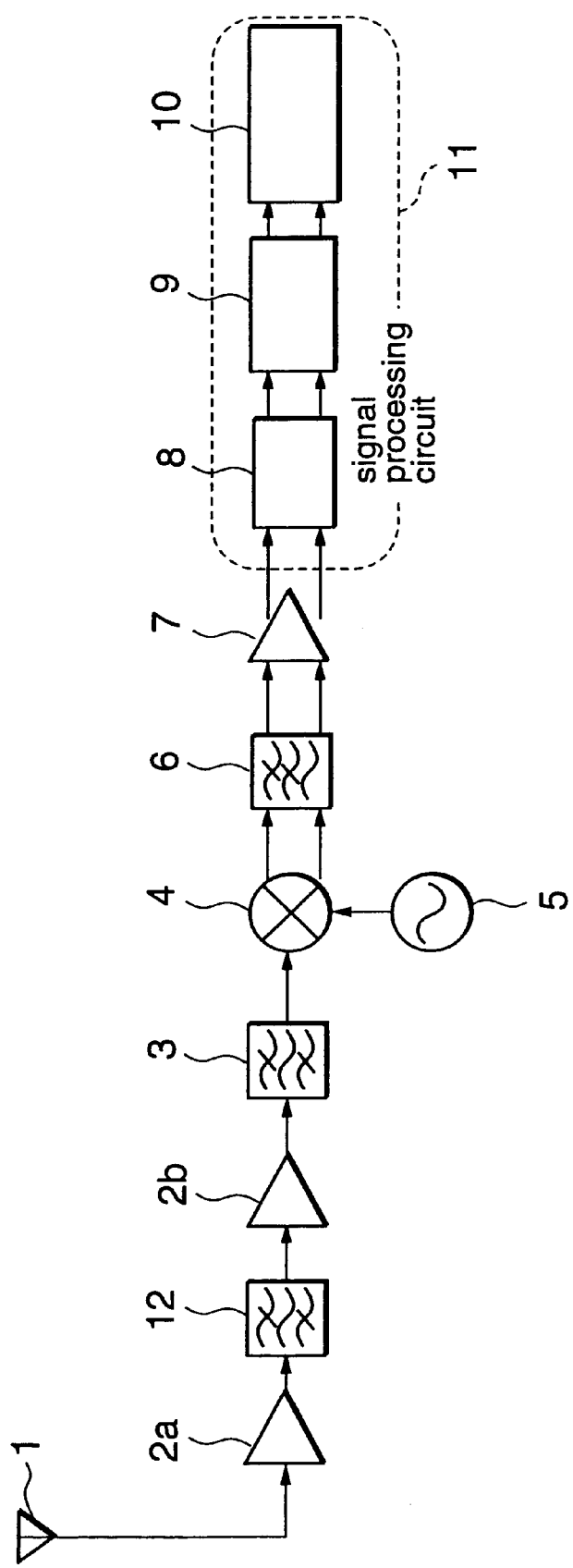
FIG. 5 is a block diagram of an even harmonic direct-conversion receiver according to a fourth preferred embodiment of the present invention.
Figure 6:
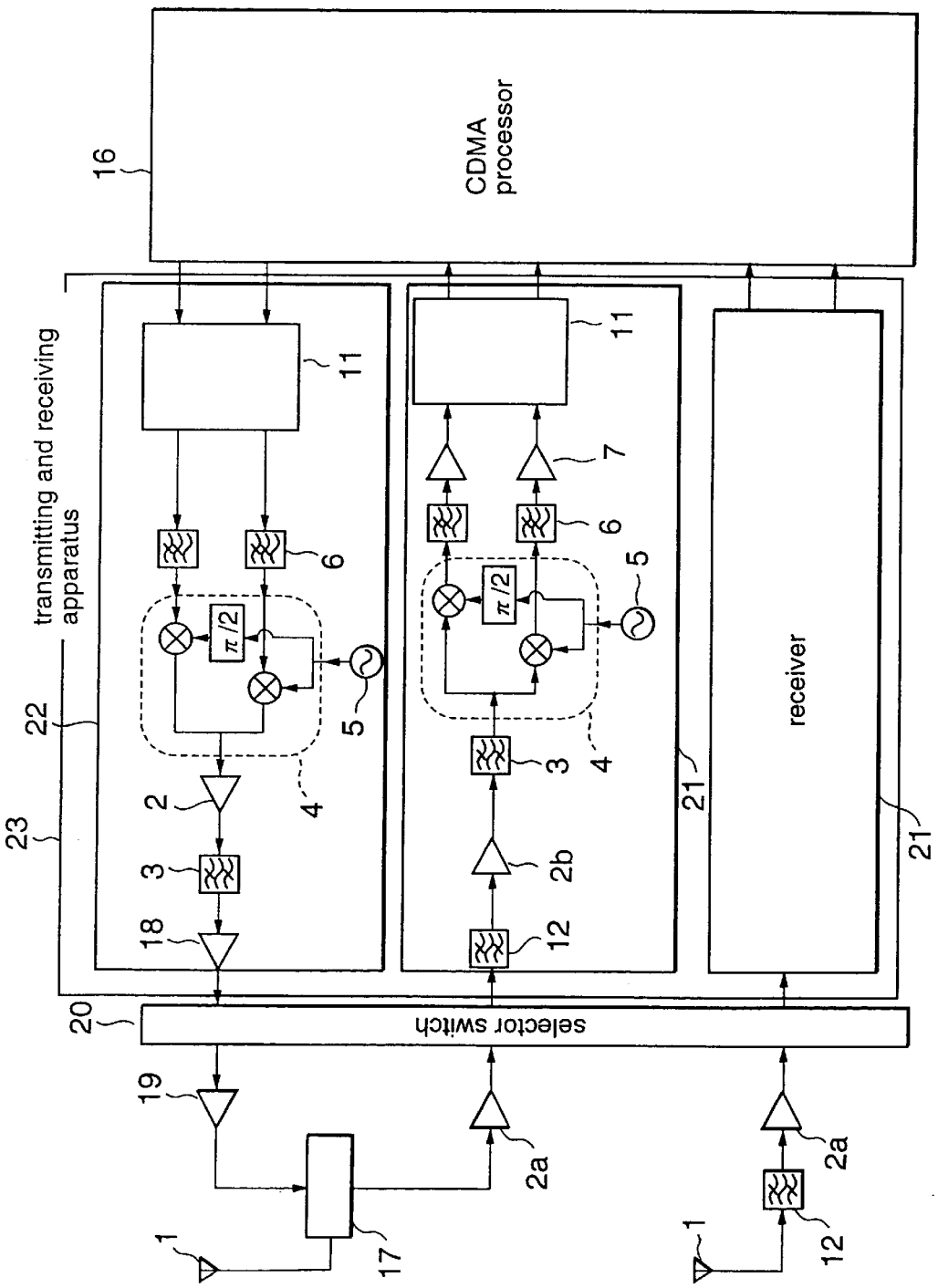
FIG. 6 is a block diagram of a transmitting and receiving apparatus used in a mobile communications terminal comprising an even harmonic direct-conversion receiver according to a fourth preferred embodiment of the present invention.

The first to third preferred embodiments described above teach an even harmonic direct-conversion receiver whereby a signal received from an antenna is amplified using a single low noise amplifier. An even harmonic direct-conversion receiver according to a fourth preferred embodiment of the invention amplifies a signal received from the antenna 1 using two low noise amplifiers 2a and 2b. FIG. 5 is a block diagram of an even harmonic direct-conversion receiver according to this fourth preferred embodiment of the present invention. FIG. 6 is a block diagram of a diversity reception type transmitting and receiving apparatus comprising an even harmonic direct-conversion receiver according to this fourth preferred embodiment, and used in a mobile communications base station, for example. It is to be noted that like parts in FIG. 5, FIG. 6, and FIG. 1 are identified by like reference numeral, and further description thereof is thus omitted below.

An even harmonic direct-conversion receiver according to this fourth preferred embodiment of the invention comprises a bandpass filter 12 inserted between a first low noise amplifier 2a and second low noise amplifier 2b. A signal received by the antenna 1 is amplified by the first low noise amplifier 2a, passed through bandpass filter 12, and input to the second low noise amplifier 2b. The received signal amplified by the second low noise amplifier 2b is filtered by bandpass filter 3 and input to the even harmonic quadrature mixer 4. The even harmonic quadrature mixer 4 mixes the received signal with a local oscillation wave output from the local oscillator 5 for conversion to I channel and Q channel baseband signals.

The bandpass filter 12 inserted between the first low noise amplifier 2a and second low noise amplifier 2b strongly suppresses radiation waves input between first and second low noise amplifiers 2a and 2b. It is therefore possible to prevent superposing a dc offset voltage on the received signal at the second low noise amplifier 2b, and reception performance capable of withstanding practical use can be assured.

An even harmonic direct-conversion receiver according to this fourth preferred embodiment can also be applied in a communications system, such as in a mobile communications base station. The diversity reception type transmitting and receiving apparatus shown in FIG. 6 comprises a transmitting and receiving apparatus 23 having a transmitter 22 and two receivers 21, a selector switch 20 for switching to the receiver 21 having the higher signal reception level, and a CDMA processor 16. The configuration and operation of receiver 21 and transmitter 22 are described next below with reference to FIG. 6.

The receiver 21 is described first. A received signal received from antenna 1 passes from duplexer 17 and is amplified by first low noise amplifier 2a. The received signal amplified by the first low noise amplifier 2a passes the bandpass filter 12, and is input to the second low noise amplifier 2b. The received signal amplified by this second low noise amplifier 2b then passes the bandpass filter 3 and is input to the even harmonic quadrature mixer 4. The even harmonic quadrature mixer 4 mixes the received signal with a local oscillation wave output from the local oscillator 5 at approximately half the received signal frequency, and outputs I channel and Q channel baseband signals. The baseband signals output from the even harmonic quadrature mixer 4 pass the low pass filter 6 and bandpass filter 7, are demodulated to the original data by the signal processing circuit 11, and then CDMA processed by the CDMA processor 16.

The transmitter 22 is described next. Data output from the CDMA processor 16 is modulated by the signal processing circuit 11 and converted to I channel and Q channel baseband signals. A noise component is removed from each of these baseband signals by low pass filter 6, and the baseband signals are then input to the even harmonic quadrature mixer 4. The even harmonic quadrature mixer 4 mixes the baseband signals with a local oscillation wave generated by the local oscillator 5 at approximately one half the frequency of the transmission signal, and the even harmonic quadrature mixer 4 then outputs the transmission signal to low noise amplifier 2. The transmission signal input to the low noise amplifier 2 is amplified and output to the bandpass filter 3. A noise component is removed from the transmission signal output to the bandpass filter 3, and the transmission signal is then output to a first high-power amplifier 18, such as a power amplifier. The first high-power amplifier 18 amplifies the transmission signal from which a noise component has been removed by the bandpass filter 3 to the transmission level transmitted from the antenna 1. The transmission signal amplified to the transmission signal level by the first high-power amplifier 18 then passes selector switch 20, a second high-power amplifier 19, and duplexer 17, and is transmitted from the antenna 1.

The even harmonic quadrature mixer disposed in the receiver 21, and the even harmonic quadrature mixer disposed in the transmitter 22, mix the local oscillation wave generated by the local oscillator 5 at approximately half the frequency of the received signal (or transmission signal) with the received signal (or transmission signal). The configuration of the even harmonic quadrature mixer 4 is shown in detail in FIG. 14. By thus applying an even harmonic direct-conversion receiver according to the fourth preferred embodiment of the present invention in a communications system, such as in a mobile communications base station, it is possible to suppress input of a local oscillation wave emitted from the local oscillator on the transmission side to a low noise amplifier on the reception side.

It is to be noted that the circuit configuration of an even harmonic direct-conversion receiver is simple compared with that of a superheterodyne receiver, and therefore contributes to downsizing and reducing the weight of the base station.

In addition, it is possible to amplify an extremely weak received signal to a level suitable for input to a downstream even harmonic quadrature mixer while maintaining a sufficient NF, and reception sensitivity capable of withstanding practical use can be achieved.

Embodiment 5

Figure 7:
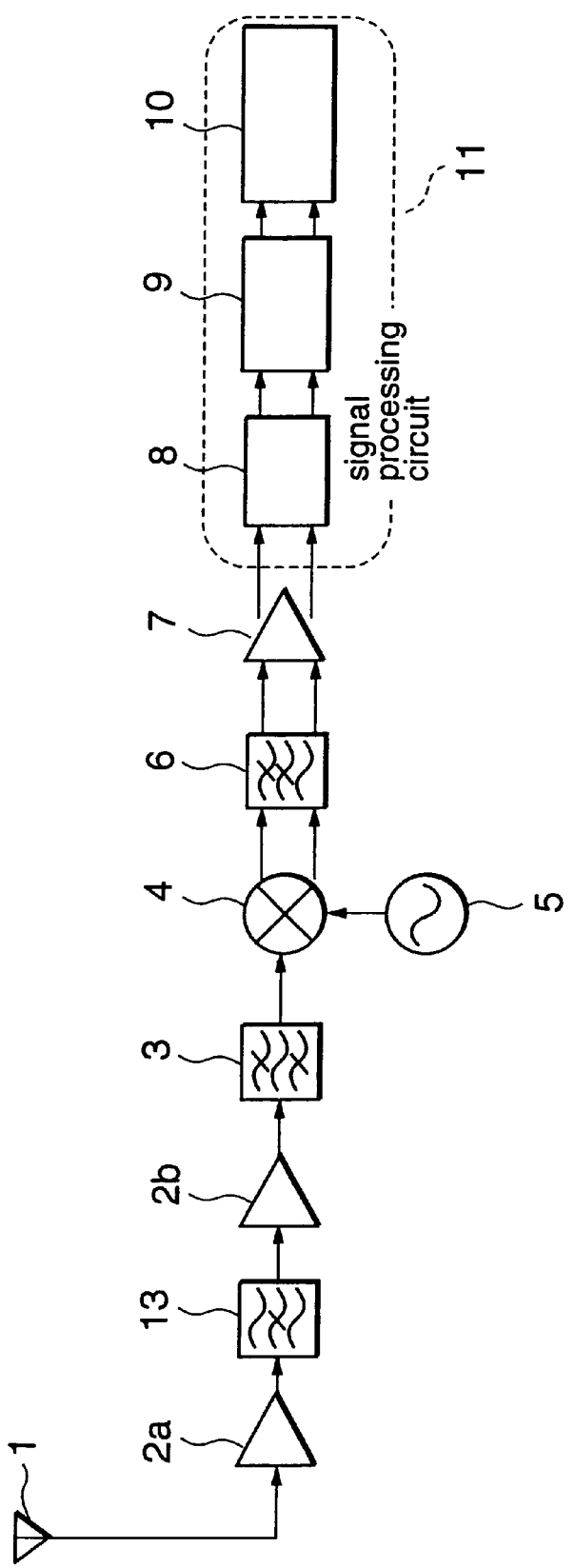
FIG. 7 is a block diagram of an even harmonic direct-conversion receiver according to a fifth preferred embodiment of the present invention.

FIG. 7 is a block diagram of an even harmonic direct-conversion receiver according to a fifth preferred embodiment of the present invention. It is to be noted that like parts in FIG. 7 and FIG. 5 are identified by like reference numeral, and further description thereof is thus omitted below.

An even harmonic direct-conversion receiver according to this fifth preferred embodiment of the invention comprises inserted between the first low noise amplifier 2a and second low noise amplifier 2b a band-elimination filter 13 for blocking a radiation wave. By thus inserting a band-elimination filter 13 before the second low noise amplifier 2b, it is possible to prevent radiation wave input to the second low noise amplifier 2b, and reception sensitivity can be improved.

Embodiment 6

Figure 8:
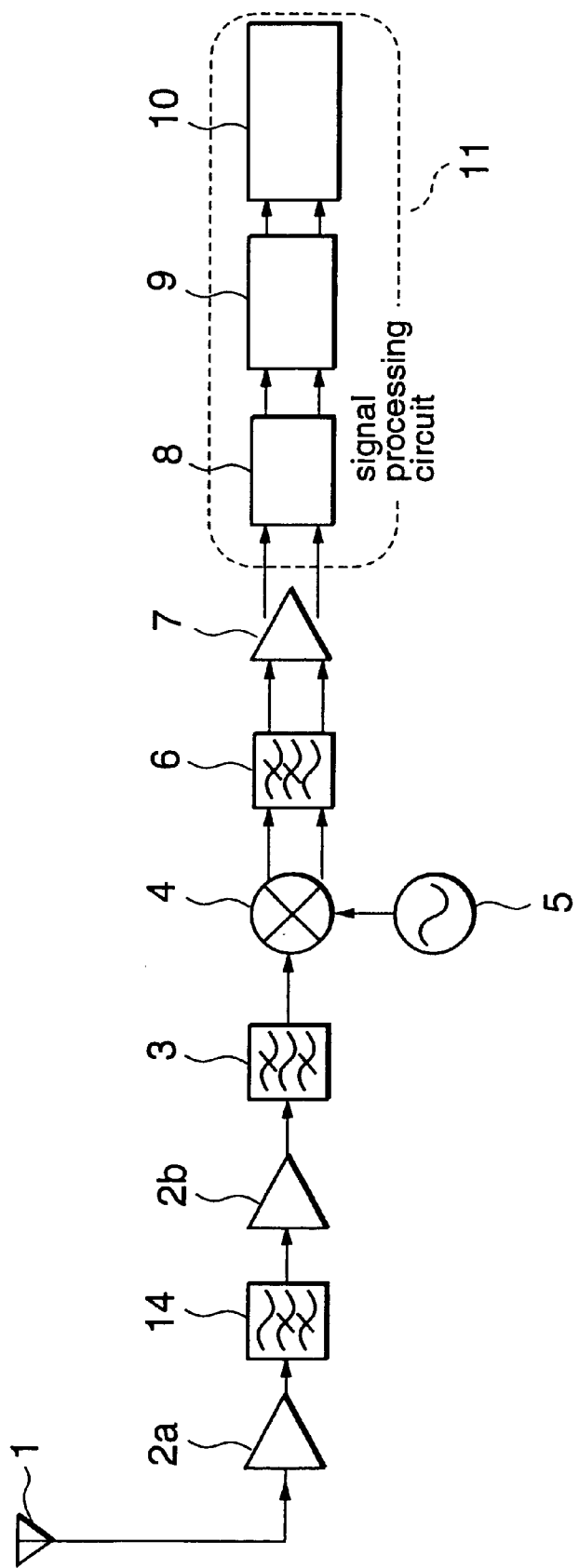
FIG. 8 is a block diagram of an even harmonic direct-conversion receiver according to a sixth preferred embodiment of the present invention.

FIG. 8 is a block diagram of an even harmonic direct-conversion receiver according to a sixth preferred embodiment of the present invention. It is to be noted that like parts in FIG. 8 and FIG. 5 are identified by like reference numeral, and further description thereof is thus omitted below.

An even harmonic direct-conversion receiver according to this fifth preferred embodiment of the invention comprises inserted between the first low noise amplifier 2a and second low noise amplifier 2b a high pass filter 14 for suppressing a local oscillation wave inserted between the first and second low noise amplifiers 2a and 2b. By thus inserting a high pass filter 14 before the second low noise amplifier 2b, radiation wave input to the second low noise amplifier 2b is prevented. As a result, reception sensitivity deterioration can be improved.

Embodiment 7

Figure 9:
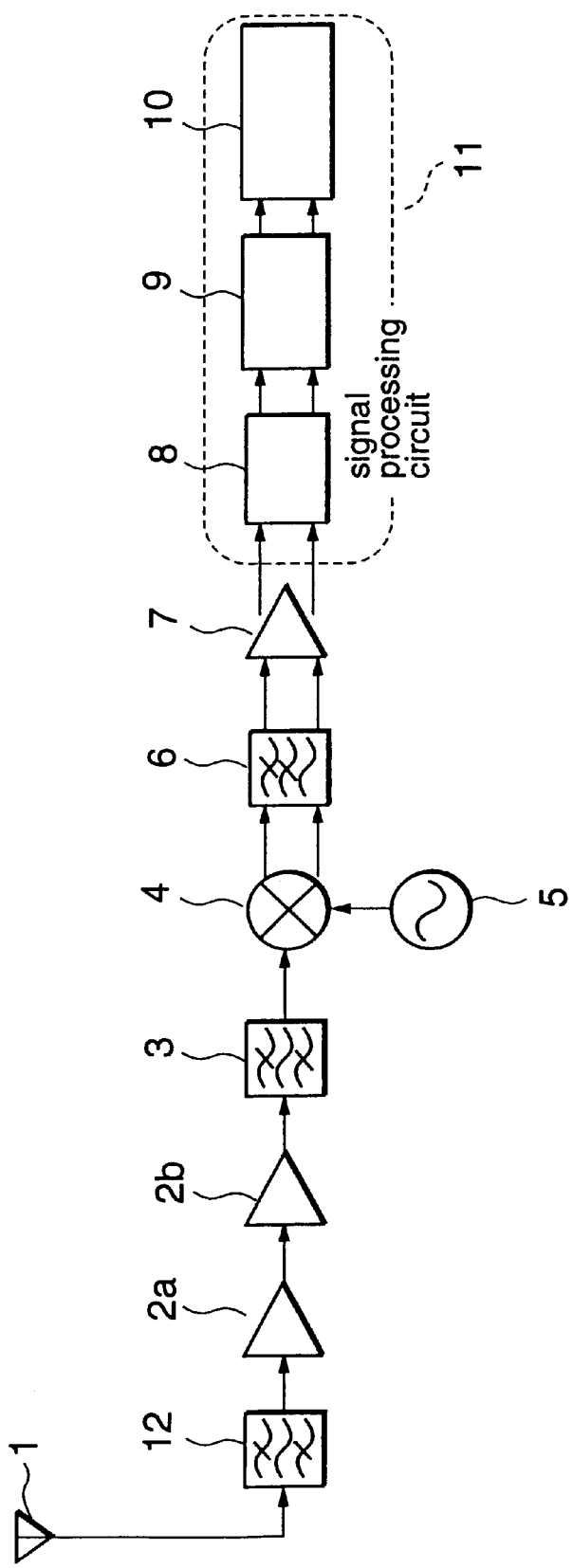
FIG. 9 is a block diagram of an even harmonic direct-conversion receiver according to a seventh preferred embodiment of the present invention.

FIG. 9 is a block diagram of an even harmonic direct-conversion receiver according to a seventh preferred embodiment of the present invention. It is to be noted that like parts in FIG. 9 and FIG. 5 are identified by like reference numeral, and further description thereof is thus omitted below.

An even harmonic direct-conversion receiver according to this seventh preferred embodiment inserts a bandpass filter 12 for strongly suppressing radiation waves before the first low noise amplifier 2a. Reception sensitivity can thus be improved because radiation wave input to the first low noise amplifier 2a is prevented by inserting the bandpass filter 12 before the first low noise amplifier 2a.

It should also be noted that the same effect can be achieved by using a band-elimination filter 13 or high pass filter 14 in place of this bandpass filter 12.

Embodiment 8

Figure 10:
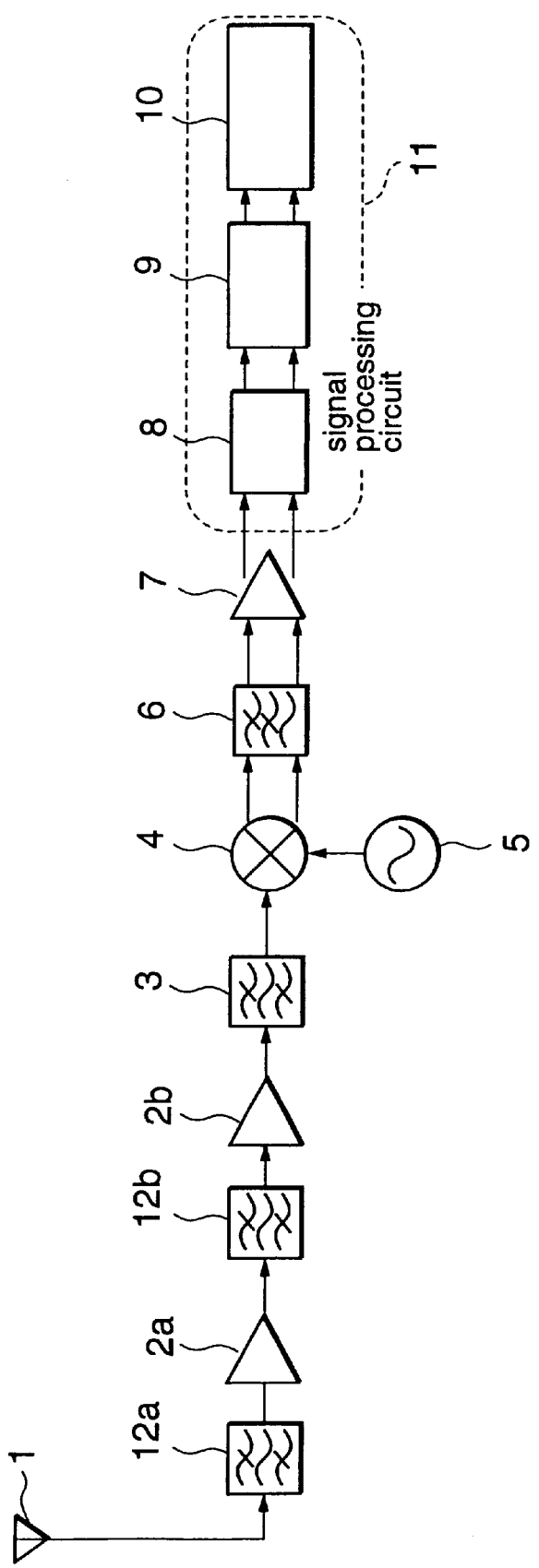
FIG. 10 is a block diagram of an even harmonic direct-conversion receiver according to an eighth preferred embodiment of the present invention.

FIG. 10 is a block diagram of an even harmonic direct-conversion receiver according to an eighth preferred embodiment of the present invention. It is to be noted that like parts in FIG. 10 and FIG. 5 are identified by like reference numeral, and further description thereof is thus omitted below.

An even harmonic direct-conversion receiver according to this eighth preferred embodiment comprises bandpass filters 12a and 12b for blocking radiation waves inserted before the first low noise amplifier 2a and second low noise amplifier 2b, respectively. By inserting a bandpass filter before the first low noise amplifier 2a and second low noise amplifier 2b, radiation waves emitted from the local oscillator 5 can be removed from input to the first low noise amplifier 2a or second low noise amplifier 2b, and reception sensitivity can therefore be improved. It should be noted that reception sensitivity can also be improved if the bandpass filters 12a and 12b inserted before the first and second low noise amplifiers 2a and 2b are replaced by a band-elimination filter 13 or high pass filter 14.

As described above in the first to eighth embodiments of the present invention, an even harmonic direct-conversion receiver according to the present invention comprises a bandpass filter, band-elimination filter, or high pass filter disposed before a low noise amplifier. It is therefore possible to prevent input of radiation waves emitted from a local oscillator to the low noise amplifier, generation of a DC offset voltage due to the nonlinearity of the low noise amplifier can be suppressed, and reception sensitivity capable of withstanding practical use can be assured.

Embodiment 9

An even harmonic direct-conversion receiver as described in the first to eighth preferred embodiment of the present invention above blocks input of radiation wave emissions from a local oscillator to a low noise amplifier by inserting a filter means before the low noise amplifier. That is, a filter means that passes the received signal and suppresses radiation wave emissions from the local oscillator at a frequency of approximately half the received signal frequency is disposed to achieve an improvement in reception sensitivity by prevent radiation waves from being input to the low noise amplifier. However, it is difficult to perfectly block radiation wave input to the low noise amplifier, and the low noise amplifier therefore desirably has a means for eliminating radiation waves input thereto. A configuration for resolving this problem is described next below with reference to FIG. 11.

Figure 11:
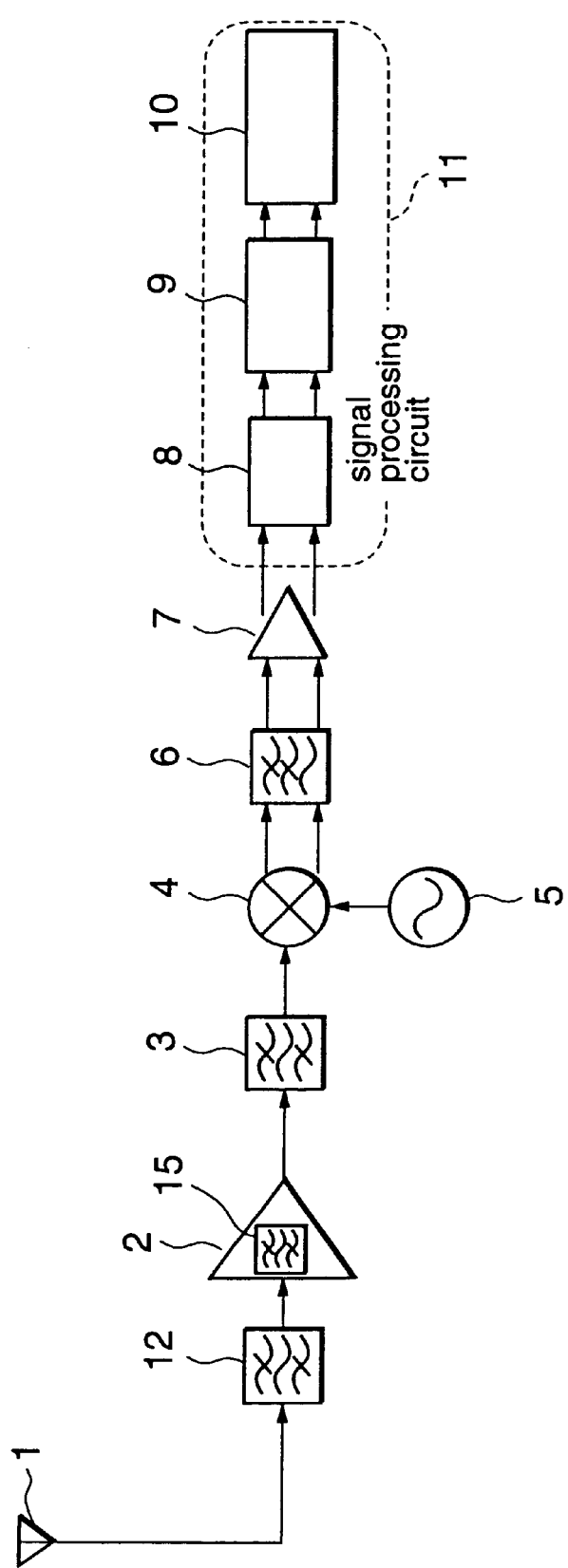
FIG. 11 is a block diagram of an even harmonic direct-conversion receiver according to a ninth preferred embodiment of the present invention.
Figure 12:
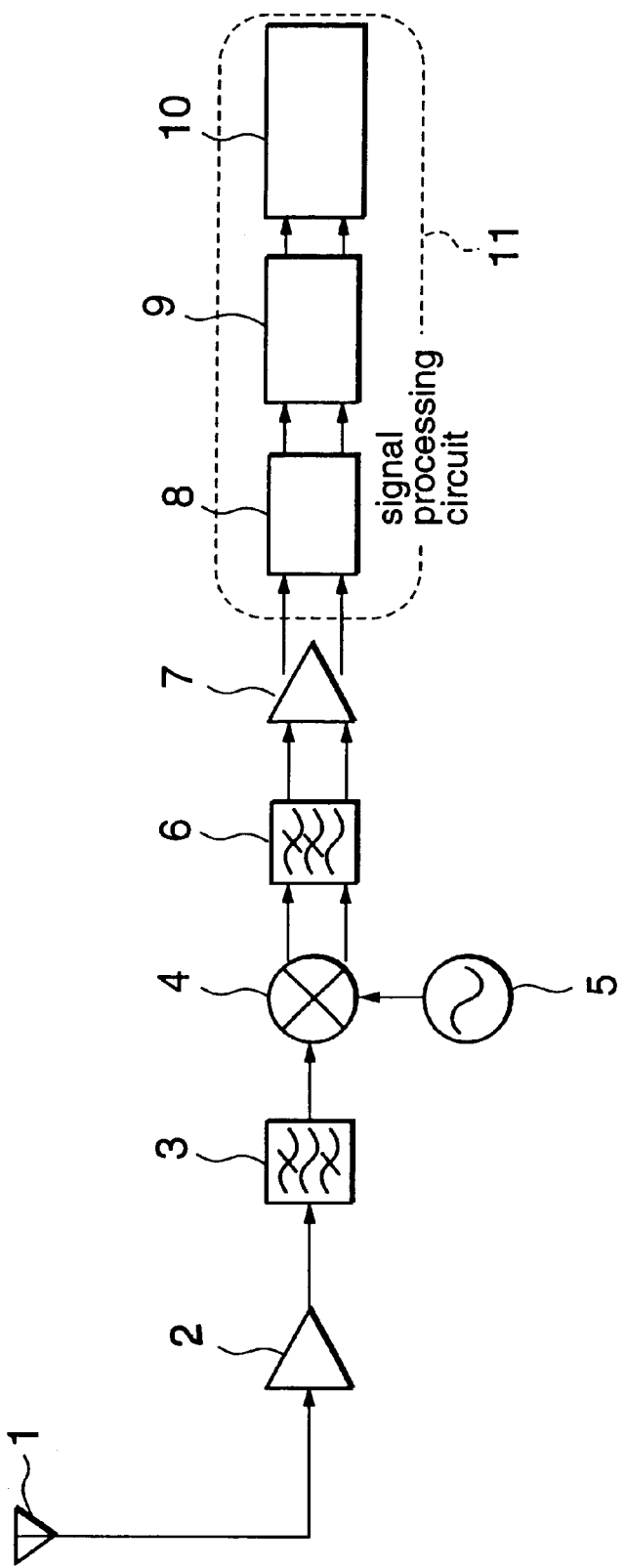
FIG. 12 is a block diagram of a conventional even harmonic direct-conversion receiver as a first example of the related art.
Figure 13:
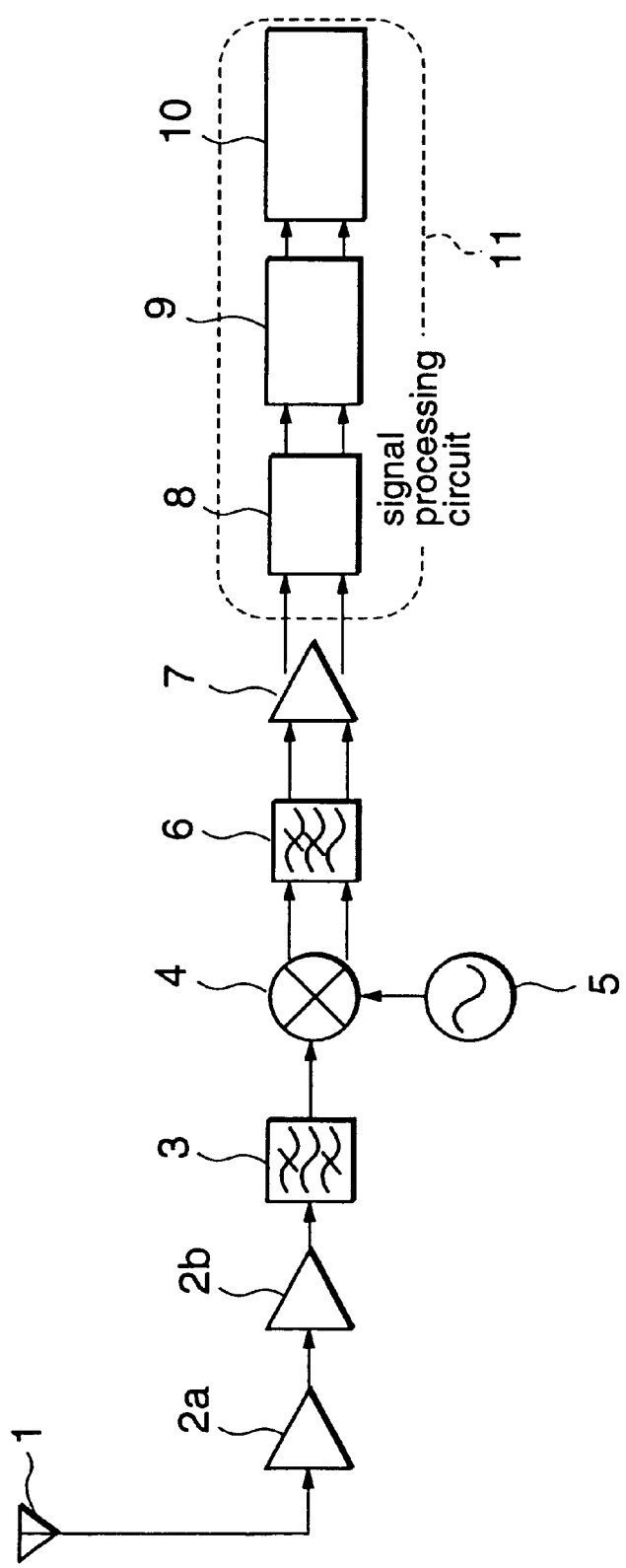
FIG. 13 is a block diagram of a conventional even harmonic direct-conversion receiver as a second example of the related art.

FIG. 11 is a block diagram of an even harmonic direct-conversion receiver according to a ninth preferred embodiment of the present invention. An even harmonic direct-conversion receiver according to this ninth preferred embodiment comprises a bandpass filter circuit 15 for eliminating radiation waves disposed to an input matching circuit in the low noise amplifier 2. By thus adding a bandpass filter circuit 15 to the input matching circuit of the low noise amplifier 2, it is possible to eliminate by means of the bandpass filter circuit 15 radiation waves input from relatively near the low noise amplifier 2, and reception sensitivity can be improved.

It should also be noted that the same effect can be achieved by using a band-elimination filter circuit or high pass filter circuit in place of the bandpass filter circuit 15 added to the input matching circuit of the low noise amplifier 2.

As described above in this ninth preferred embodiment of the invention, radiation waves input before the low noise amplifier 2 can be eliminated within the low noise amplifier 2 by disposing in the low noise amplifier 2 a bandpass filter circuit 15 for eliminating input radiation waves, and deterioration of reception sensitivity can be suppressed.

Furthermore, a mobile communications terminal and mobile communications base station that are small, lightweight, and have outstanding reception sensitivity can be provided by applying an even harmonic direct-conversion receiver as described in the above first to ninth preferred embodiments of the present invention to a transmitting and receiving apparatus such as a mobile communications terminal or mobile communications base station.

What is claimed is:

1. An even harmonic direct-conversion receiver, comprising:

an antenna configured to receive and output a received wave having a received wave frequency;

an amplifier configured to amplify said received wave and to output an amplified signal;

a bandpass filter disposed after said amplifier and configured to output a bandpass limited amplified signal;

a local oscillator configured to output a local oscillation wave having an oscillation wave frequency at approximately half said received wave frequency;

an even harmonic quadrature mixer configured to mix said bandpass limited amplified signal with said local oscillation wave and to output a baseband signal;

a signal processing circuit configured to demodulate said baseband signal; and a filter device disposed before said amplifier, said filter device configured to pass said received wave and to substantially suppress a frequency band corresponding to said oscillation wave frequency.

2. The even harmonic direct-conversion receiver as set forth in claim 1, wherein said filter device comprises a bandpass filter.

3. The even harmonic direct-conversion receiver as set forth in claim 1, wherein said filter device comprises a band-elimination filter.

4. The even harmonic direct-conversion receiver as set forth in claim 1, wherein said filter device comprises a high pass filter.

5. The even harmonic direct-conversion receiver as set forth in claim 1, wherein said amplifier comprises an amplifier filter circuit configured to further suppress said frequency band corresponding to said oscillation wave frequency.

6. An even harmonic direct-conversion receiver, comprising:

an antenna configured to receive and output a received wave having a received wave frequency;

a first amplifier configured to amplify said received wave and to output a first amplified signal;

a second amplifier configured to amplify said first amplified signal and to output a second amplified signal;

a bandpass filter disposed after said second amplifier and configured to output a bandpass limited second amplified signal;

a local oscillator configured to output a local oscillation wave having an oscillation wave frequency at approximately half said received wave frequency;

an even harmonic quadrature mixer configured to mix said bandpass limited second amplified signal with said local oscillation wave and to output a baseband signal;

a signal processing circuit configured to demodulate said baseband signal;

a bandpass filter disposed after said second amplifier; and a filter device disposed before one of said first amplifier and said second amplifier, said filter device configured to pass a corresponding output of one of said antenna and said first amplifier and to substantially suppress a frequency band corresponding to said oscillation wave frequency.

7. The even harmonic direct-conversion receiver as set forth in claim 6, wherein said filter device comprises a bandpass filter.

8. The even harmonic direct-conversion receiver as set forth in claim 6, wherein said filter device comprises a band elimination filter.

9. The even harmonic direct-conversion receiver as set forth in claim 6, wherein said filter device comprises a high pass filter.

10. The even harmonic direct-conversion receiver as set forth in claim 6, wherein at least one of said first amplifier and said second amplifier comprises an amplifier filter circuit configured to further suppress said frequency band corresponding to said oscillation wave frequency.

11. A transmitting and receiving apparatus, comprising:
an antenna configured to receive and output a received wave having a received wave frequency;
an even harmonic direct-conversion receiver having
a receiver amplifier configured to amplify said received wave and to output an amplified signal,
a bandpass filter disposed after said receiver amplifier and configured to output a bandpass limited amplified signal,
a local receiver oscillator configured to output a local oscillation wave having a receiver oscillator frequency at approximately half said received wave frequency,
a receiver even harmonic quadrature mixer configured to mix said bandpass limited amplified signal with said local receiver oscillation wave and to output a received baseband signal,
a receiver signal processing circuit configured to demodulate said received baseband signal, and
a receiver filter device disposed before said amplifier, configured to pass said received wave and to substantially suppress a frequency band corresponding to said oscillation wave frequency; and
a transmitter having
a transmitter signal processing section configured to process a signal output from said even harmonic direct conversion receiver and to output a transmission baseband signal,
a transmitter signal processing circuit configured to modulate said transmission baseband signal,
a local transmitter oscillator configured to output a local transmitter oscillation wave having a transmitter oscillator frequency of approximately half said transmission signal frequency, and
a transmitter even harmonic quadrature mixer configured to mix said local transmitter oscillation wave with said transmission baseband signal and to output a transmission signal.

12. A transmitting and receiving apparatus, comprising:
an antenna configured to receive and output a received wave having a received wave frequency;
an even harmonic direct-conversion receiver having
a first receiver amplifier configured to amplify said received wave and to output a first amplified signal,
a second receiver amplifier configured to amplify said first amplified signal and to output a second amplified signal,
a bandpass filter disposed after said second receiver amplifier and configured to output a bandpass limited second amplified signal,
a local receiver oscillator configured to output a local receiver oscillation wave having a receiver oscillation frequency of approximately half said received wave,
a receiver even harmonic quadrature mixer configured to mix said bandpass limited second amplified signal with said local receiver oscillation wave and to output a receiver baseband signal;
a receiver signal processing circuit configured to demodulate said receiver baseband signal; and
a receiver filter device disposed before one of said first amplifier and said second amplifier, said receiver filter device configured to pass a corresponding output of one of said antenna and said first receiver amplifier and to substantially suppress a frequency band corresponding to said oscillation wave frequency; and
a transmitter having
a transmitter signal processing section configured to process a signal output from said even harmonic direct conversion receiver and to output a transmission baseband signal,
a transmitter signal processing circuit configured to modulate said transmission baseband signal,
a local transmitter oscillator configured to output a local transmitter oscillation wave having a transmitter oscillator frequency of approximately half said transmission signal frequency, and
a transmitter even harmonic quadrature mixer configured to mix said local transmitter oscillation wave with said transmission baseband signal and to output a transmission signal.

* * * * *